United States Patent
Kang et al.

(10) Patent No.: US 9,809,751 B2
(45) Date of Patent: Nov. 7, 2017

(54) LIQUID CRYSTAL PHOTO-ALIGNMENT AGENT, LIQUID CRYSTAL PHOTO-ALIGNMENT FILM MANUFACTURED USING THE SAME, METHOD OF MANUFACTURING THE SAME, AND LIQUID CRYSTAL DISPLAY INCLUDING LIQUID CRYSTAL PHOTO-ALIGNMENT FILM

(71) Applicant: Samsung Display Co., Ltd., Yongin-si (KR)

(72) Inventors: Suk Hoon Kang, Seoul (KR); Jin-Soo Jung, Hwaseong-si (KR); Jun Woo Lee, Seongnam-si (KR); Jong Hwan Jeon, Gwangju-si (KR); In Ok Kim, Osan-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/996,960

(22) Filed: Jan. 15, 2016

(65) Prior Publication Data

US 2016/0230095 A1    Aug. 11, 2016

(30) Foreign Application Priority Data

Feb. 11, 2015 (KR) .................. 10-2015-0020919

(51) Int. Cl.
*C08G 73/10* (2006.01)
*C09K 19/56* (2006.01)
*G02F 1/1337* (2006.01)

(52) U.S. Cl.
CPC .......... *C09K 19/56* (2013.01); *C08G 73/1075* (2013.01); *G02F 1/133723* (2013.01); *G02F 1/133788* (2013.01); *C08G 73/1042* (2013.01); *Y10T 428/1005* (2015.01)

(58) Field of Classification Search
CPC ............... G02F 1/133723; C08L 79/08; Y10T 428/1005; Y10T 428/1023; C08G 73/1042
See application file for complete search history.

(56) References Cited

U.S. PATENT DOCUMENTS

| | | | | |
|---|---|---|---|---|
| 4,656,116 A | * | 4/1987 | Rohde | C08L 79/08 430/196 |
| 5,773,559 A | * | 6/1998 | Miyamoto | C08G 73/1042 427/359 |
| 6,063,829 A | | 5/2000 | Endou et al. | |
| 2004/0062878 A1 | * | 4/2004 | Mano | C08G 73/10 428/1.1 |
| 2005/0271833 A1 | * | 12/2005 | Matsumori | G02F 1/134363 428/1.25 |
| 2014/0066590 A1 | | 3/2014 | Suzuki et al. | |
| 2014/0255710 A1 | | 9/2014 | Oishi et al. | |

FOREIGN PATENT DOCUMENTS

| | | |
|---|---|---|
| JP | 2008116809 | 5/2008 |
| JP | 2012093642 | 5/2012 |
| KR | 1020140026431 | 3/2014 |
| KR | 1020140037836 | 3/2014 |
| KR | 1020140051405 | 4/2014 |

* cited by examiner

*Primary Examiner* — Gregory Listvoyb
(74) *Attorney, Agent, or Firm* — H.C. Park & Associates, PLC

(57) ABSTRACT

A liquid crystal photo-alignment agent includes a polyimide copolymer including a first structure unit represented by the described Chemical Formula 1 and a second structure unit represented by the described Chemical Formula 2, and, based on a 100 mole % sum total of the first structure unit and the second structure unit, the first structure unit is included in an amount of 70 to 95 mole % and the second structure unit is included in an amount of 5 to 30 mole %. A liquid crystal photo-alignment film may be manufactured using the same, and a liquid crystal display may include the liquid crystal photo-alignment film.

9 Claims, 1 Drawing Sheet

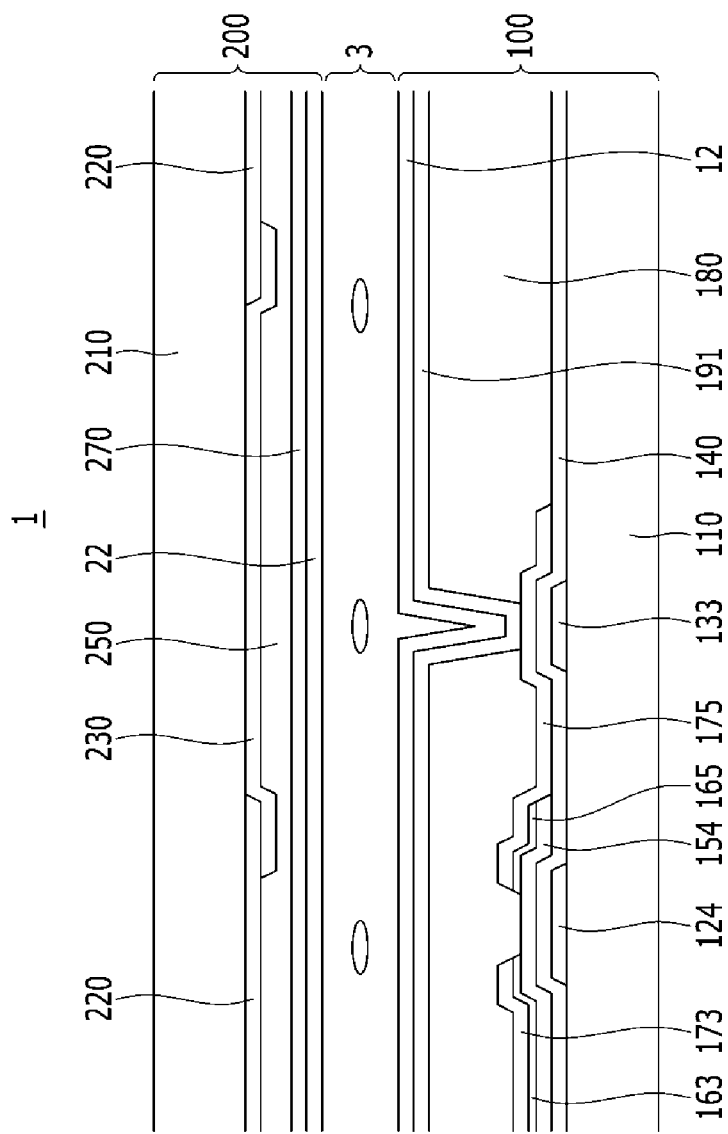

LIQUID CRYSTAL PHOTO-ALIGNMENT AGENT, LIQUID CRYSTAL PHOTO-ALIGNMENT FILM MANUFACTURED USING THE SAME, METHOD OF MANUFACTURING THE SAME, AND LIQUID CRYSTAL DISPLAY INCLUDING LIQUID CRYSTAL PHOTO-ALIGNMENT FILM

CROSS REFERENCE TO RELATED APPLICATION

This application claims priority from and the benefit of Korean Patent Application No. 10-2015-0020919, filed on Feb. 11, 2015, which is hereby incorporated by reference for all purposes as if fully set forth herein.

BACKGROUND

Field

Exemplary embodiments relate to a liquid crystal photo-alignment agent, a liquid crystal photo-alignment film manufactured using the same, a method of manufacturing the same, and a liquid crystal display including the liquid crystal photo-alignment film.

Discussion of the Background

A liquid crystal display, which is one of the most common types of flat panel displays currently in use, typically includes two panels having field-generating electrodes, such as a pixel electrode and a common electrode, formed thereon, and a liquid crystal layer interposed therebetween. The liquid crystal display may generate electric fields in a liquid crystal layer by applying voltage to the field-generating electrodes, and may change the direction of liquid crystal molecules of the liquid crystal layer according to the generated electric field, thereby controlling polarization of incident light so as to display images.

The two panels constituting the liquid crystal display may include a thin film transistor array panel and a counter display panel. In the thin film transistor array panel, a gate line for transferring a gate signal and a data line for transferring a data signal may cross each other, and a thin film transistor connected to the gate line and the data line, a pixel electrode connected to the thin film transistor, and the like may be formed. A light blocking member, a color filter, a common electrode, and the like may be formed in the counter display panel. However, the light blocking member, the color filter, and the common electrode may alternatively be formed in the thin film transistor array panel.

In a typical liquid crystal display, in order to use liquid crystals as an optical switch as set forth above, the liquid crystals may be initially aligned in a predetermined direction on the innermost layer of a display cell on which the thin film transistor is formed. To this end, a liquid crystal photo-alignment film is typically used.

The liquid crystal photo-alignment film may direct the arrangement of the liquid crystal molecules to set a direction when the liquid crystals are moved by an electric field to form an image. Generally, in order to obtain uniform luminance and a high contrast ratio in the liquid crystal display, the liquid crystals are uniformly aligned.

As a general method of aligning the liquid crystals, a rubbing method including applying a polymer film such as polyimide on a substrate such as glass and rubbing a surface in a predetermined direction by fibers such as nylon or polyester is used. However, in the rubbing method, when the fibers and the polymer film are rubbed, fine dust or electrical discharge (ESD) may occur, which may cause serious problems when a liquid crystal panel is manufactured.

In order to solve problems inherent in the rubbing method, a photo-alignment method in which anisotropy is induced to the polymer film by light radiation instead of friction thereby arranging the liquid crystals using anisotropy has been researched.

Generally, in the photo-alignment method, an alignment layer including a photo-alignment (photo-reactive) polymer is formed under the liquid crystal layer and linearly polarized UV is radiated on the alignment layer to cause a photo-reaction. As a result, the photo-alignment in which main chains of the photo-alignment polymer are arranged in a set direction occurs, and the liquid crystals included in the liquid crystal layer may be aligned by the photo-aligned alignment layer. However, the photo-alignment polymer described above has drawbacks in that structural and thermal stabilities of a polymer main chain are poor and alignment and the generation of afterimages remain problematic.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal photo-alignment film manufactured by using the liquid crystal photo-alignment agent.

Exemplary embodiments also provide a method of manufacturing the liquid crystal photo-alignment film.

Exemplary embodiments also provide a liquid crystal display including the liquid crystal photo-alignment film.

Additional aspects will be set forth in the detailed description which follows, and, in part, will be apparent from the disclosure, or may be learned by practice of the inventive concept.

An exemplary embodiment of the present invention discloses a liquid crystal photo-alignment agent, including: a polyimide copolymer including a first structure unit represented by the following Chemical Formula 1 and a second structure unit represented by the following Chemical Formula 2, in which based on 100 mole % of a sum total of the first structure unit and the second structure unit, the first structure unit is included in a content of 70 to 95 mole % and the second structure unit is included in a content of 5 to 30 mole %.

[Chemical Formula 1]

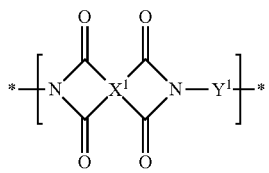

[Chemical Formula 2]

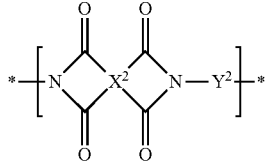

(In Chemical Formulas 1 and 2, $X^1$ is a tetravalent organic group selected from the following Chemical Formula 1A, $X^2$ is a tetravalent organic group of the following Chemical Formula 2A, and $Y^1$ and $Y^2$ are a divalent organic group induced from aromatic diamine.)

[Chemical Formula 1A]

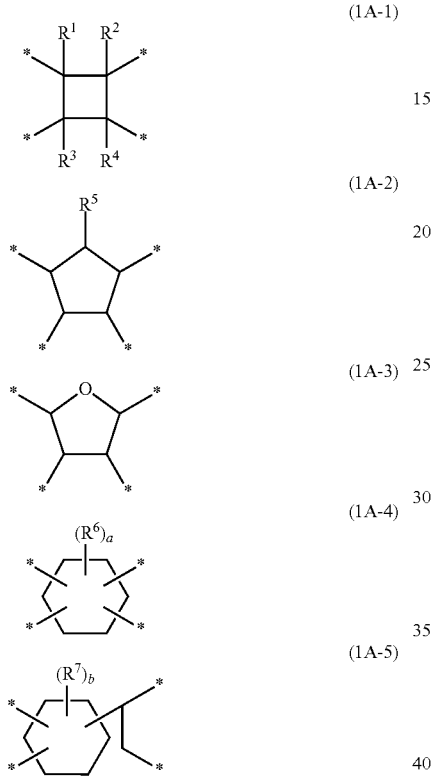

(In Chemical Formula 1A, $R^1$ to $R^7$ are each independently selected from hydrogen, a halogen, a substituted or unsubstituted C1 to C20 alkyl group, and a combination thereof, a is an integer of 0 to 2, b is an integer of 0 to 3, and in the case where b is 2 or more, a plurality of $R^7$s may be different from each other and may be connected to each other to form a fused ring fused with a cyclohexyl group.)

[Chemical Formula 2A]

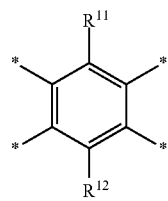

(In Chemical Formula 2A, $R^{11}$ and $R^{12}$ are each independently selected from hydrogen, a halogen, a substituted or unsubstituted C1 to C20 alkyl group, and a combination thereof.)

An exemplary embodiment also discloses a liquid crystal photo-alignment film that includes the liquid crystal photo-alignment agent described above.

An exemplary embodiment further discloses a method of manufacturing a liquid crystal photo-alignment film that includes applying the liquid crystal photo-alignment agent on a substrate, performing a primary bake process on the applied liquid crystal photo-alignment agent, and after exposure, performing a secondary bake process.

Still another exemplary embodiment discloses a liquid crystal display, including: the liquid crystal photo-alignment film described above.

Specific matters of other exemplary embodiments of the present invention are included in the following detailed description.

According to the exemplary embodiments, it is possible to provide a liquid crystal photo-alignment agent providing a liquid crystal display having improved afterimage and film hardness of the liquid crystal display.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 1 is a schematic cross-sectional view of a liquid crystal display including a liquid crystal photo-alignment film according to an exemplary embodiment.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Unless particularly mentioned in the present specification, the term "substituted" refers to at least one hydrogen atom substituted by a substituent group of a halogen atom (F, Cl, Br, I), a hydroxy group, a C1 to C20 alkoxy group, a nitro group, a cyano group, an amino group, an imino group, an azido group, an amidino group, a hydrazino group, a hydrazono group, a carbonyl group, a carbamyl group, a thiol group, an ester group, an ether group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C3 to C20 cycloalkyl group, a C3 to C20 cycloalkenyl group, a C3 to C20 cycloalkynyl group, a C2 to C20 heterocycloalkyl group, a C2 to C20 heterocycloalkenyl group, a C2 to C20 heterocycloalkynyl group, a C3 to C30 heteroaryl group, or a combination thereof.

Further, unless particularly mentioned in the present specification, the term "hetero" refers to at least one hetero atom of N, O, S, and P included in a cyclic group.

Further, unless particularly mentioned in the present specification, the term "alicyclic" refers to C3 to C40 cycloalkyl, C3 to C40 cycloalkenyl, C3 to C40 cycloalkynyl, C3 to C40 cycloalkylene, C3 to C40 cycloalkenylene, or C3 to C40 cycloalkynylene and specifically refers to C3 to C20 cycloalkyl, C3 to C20 cycloalkenyl, C3 to C20 cycloalkynyl, C3 to C20 cycloalkylene, C3 to C20 cycloalkenylene, or C3 to C20 cycloalkynylene, and the term "aromatic" refers to C6 to C40 aryl, C2 to C40 heteroaryl, C6 to C40 arylene, or C2 to C40 heteroarylene and specifically refers to C6 to C16 aryl, C2 to C16 heteroaryl, C6 to C16 arylene, or C2 to C16 heteroarylene.

Further, unless particularly mentioned in the present specification, the term "combination" generally refers to mixing or copolymerization. In an alicyclic organic group and an aromatic organic group, two or more cycles form a fused cycle or two or more cycles are connected to each other by a functional group of a single bond, —O—, —S—, —C(=O)—, —CH(OH)—, —S(=O)—, —S(=O)$_2$—, —Si(CH$_3$)$_2$—, —(CH$_2$)$_p$— (herein, 1<p<2), —(CF$_2$)$_q$— (herein, 1<q<2), —C(CH$_3$)$_2$—, —CH(CH$_3$)—, —C(CF$_3$)$_2$—, —CH(CF$_3$)—, or —C(=O)NH—. Herein, the term "copolymerization" refers to block copolymerization or random copolymerization, and the term "copolymer" refers to a block copolymer or a random copolymer.

Further, unless particularly mentioned in the present specification, the term "halogen" refers to F, Cl, Br, or I.

A liquid crystal photo-alignment agent according to an exemplary embodiment includes a polyimide copolymer, and hereinafter, the polyimide copolymer will be specifically described with reference to the accompanying drawings.

The polyimide copolymer includes a first structure unit represented by the following Chemical Formula 1 and a second structure unit represented by the following Chemical Formula 2, and, based on a 100 mole % sum total of the first structure unit and the second structure unit, the first structure unit is included in an amount of 70 to 95 mole % and the second structure unit is included in an amount of 5 to 30 mole %.

[Chemical Formula 1]

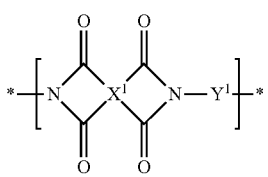

[Chemical Formula 2]

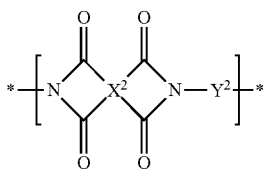

(In Chemical Formulas 1 and 2, $X^1$ is a tetravalent organic group selected from the following Chemical Formula 1A, $X^2$ is a tetravalent organic group of the following Chemical Formula 2A, and $Y^1$ and $Y^2$ are a divalent organic group induced from aromatic diamine.)

[Chemical Formula 1A]

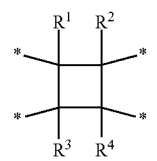 (1A-1)

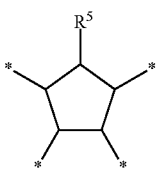 (1A-2)

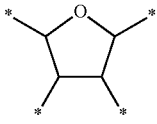 (1A-3)

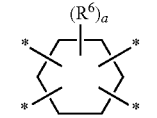 (1A-4)

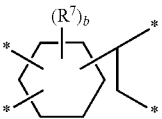 (1A-5)

(In Chemical Formula 1A, $R^1$ to $R^7$ are each independently selected from hydrogen, a halogen, a substituted or unsubstituted C1 to C20 alkyl group, and a combination thereof, a is an integer of 0 to 2, b is an integer of 0 to 3, and in the case where b is 2 or more, a plurality of $R^7$s may be different from each other and may be connected to each other to form a fused ring fused with a cyclohexyl group.)

[Chemical Formula 2A]

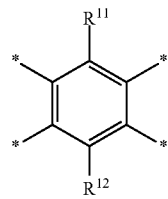

(In Chemical Formula 2A, $R^{11}$ and $R^{12}$ are each independently selected from hydrogen, a halogen, a substituted or unsubstituted C1 to C20 alkyl group, and a combination thereof.)

Specific examples of 1A-5 may include the following Chemical Formula 1A-6.

[Chemical Formula 1A-6]

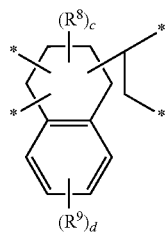

(In Chemical Formula 1A-6, $R^8$ and $R^9$ are each independently selected from hydrogen, a halogen, a substituted or unsubstituted C1 to C20 alkyl group, and a combination thereof, c is an integer of 0 to 2, and d is an integer of 0 to 4.)

Liquid crystal molecules may be arranged using three molecule alignments including a vertical alignment, a horizontal alignment, and an inclination alignment. In the vertical alignment, the molecules may be aligned such that a long axis direction of the liquid crystal molecules is vertical to a substrate surface. The horizontal alignment is performed such that the long axis direction of the liquid crystal molecules is horizontal to the substrate surface. The inclination alignment is performed such that the long axis direction of the liquid crystal molecules is inclined to the substrate surface at a predetermined angle. In all of the aforementioned alignments, the substrate surface is treated to form an alignment film to have individual alignments. Physical properties of the liquid crystal are changed according to arrangement of the liquid crystal molecules, and there occurs a difference between responses to external force such as an electric field.

The liquid crystal photo-alignment agent according to the exemplary embodiment includes the polyimide copolymer including the first structure unit and the second structure unit instead of using a polymer including the first structure unit and a polymer including the second structure unit which are mixed, and thus an AC afterimage and a printing property may be improved and a liquid crystal photo-alignment film having uniform alignment may be provided.

The liquid crystal photo-alignment agent includes the first structure unit represented by Chemical Formula 1 and the second structure unit represented by Chemical Formula 2, and the first structure unit and the second structure unit exist in a predetermined content ratio in the liquid crystal photo-alignment agent.

That is, the first structure unit and the second structure unit may be included in a content of 70 to 95 mole % and 5 to 30 mole %, respectively, to minimize an alternating current (AC) afterimage and improve alignment, direct current (DC) afterimage, and film hardness. If the content of the first structure unit is less than 70 mole %, the alignment properties and the alternating current (AC) afterimage improvement are reduced. If the content of the first structure unit is more than 95 mole %, the direct current (DC) afterimage improvement and a film hardness improvement effects are mitigated.

In another exemplary embodiment, the first structure unit may be included in an amount of 75 to 90 mole % and the second structure unit may be included in an amount of 10 to mole % based on a 100 mole % sum total of the first structure unit and the second structure unit.

In yet another exemplary embodiment, the first structure unit may be included in an amount of 75 to 85 mole % and the second structure unit may be included in an amount of 15 to 25 mole % based on a 100 mole % sum total of the first structure unit and the second structure unit. In the aforementioned range, alignment properties, the direct current (DC) afterimage, the alternating current (AC) afterimage, and film hardness may be further improved.

The second structure unit may increase bonding energy through a π-π interaction of a benzene ring when the film is formed to increase a packing density between molecular layers, thereby improving film hardness, and suppressing occurrence of the afterimage.

The polyimide copolymer is manufactured by copolymerizing alicyclic acid dianhydride, pyromellitic acid dianhydride (PMDA), and aromatic diamine providing structures of Chemical Formula 1A to manufacture a polyamic acid and imidizing the polyamic acid. As a method of manufacturing the polyamic acid, any method capable of being used in synthesizing of the polyamic acid may be applied without specific limitation.

As alicyclic acid dianhydride, at least one selected from 1,2,3,4-cyclobutanetetracarboxylic acid dianhydride (CBDA), a 1,2,3,4-cyclobutanetetracarboxylic acid dianhydride (CBDA) derivative, 2,3,4,5-tetrahydrofurantetracarboxylic acid dianhydride, 3,4-dicarboxy-1-cyclohexylsuccinic acid dianhydride, and 3,4-dicarboxy-1,2,3,4-tetrahydro-1-naphthalenesuccinic acid dianhydride may be used, but alicyclic acid dianhydride is not limited thereto.

Aromatic diamine may be compounds represented by the following Chemical Formulas 3A to 3D.

[Chemical Formula 3A]

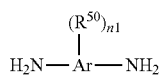

[Chemical Formula 3B]

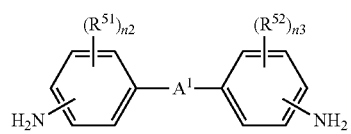

[Chemical Formula 3C]

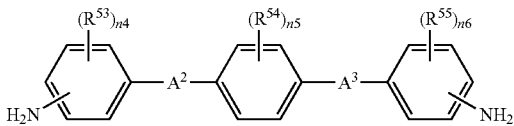

[Chemical Formula 3D]

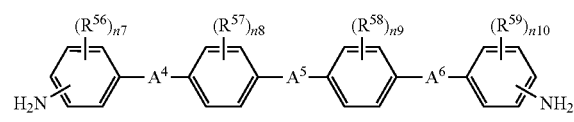

(In Chemical Formulas 3A to 3D,

Ar is a C6 to C20 arylene group, $R^{50}$ to $R^{59}$ are each independently a hydrogen atom, a substituted or unsubstituted C1 to C20 alkyl group, a substituted or unsubstituted C1 to C20 alkoxy group, a substituted or unsubstituted C6 to C30 aryl group, or a substituted or unsubstituted C2 to C30 heteroaryl group, —($CH_2$)— of the alkyl group, the aryl group, and the heteroaryl group may be each substituted by at least one selected from —O—, —C(=O)—O—, —C(=O)—O—, —C(=O)—N($R^a$)—, —N($R^b$)—C(=O)—, and —O—C(=O)— (herein, $R^a$ and $R^b$ are each independently hydrogen or a substituted or unsubstituted C1 to C8 alkyl group), $A^1$ to $A^6$ are each independently a single bond, —O—, —S(=O)$_2$—, or —C($R^x$)($R^y$)— (herein, $R^x$ and $R^y$ are each independently a hydrogen atom, or a substituted or unsubstituted C1 to C8 alkyl group), and $n^1$ to $n^{10}$ are each an integer of 0 to 4.)

Specific examples of aromatic diamine may include aromatic diamine such as p-phenylenediamine, m-phenylenediamine, 2,5-diaminotoluene, 2,6-diaminotoluene, 4.4'-diaminobiphenyl, 3,3'-dimethyl-4,4'-diaminobiphenyl, 3,3'-dimethoxy-4,4'-diaminobiphenyl, diaminodibiphenylmethane, diaminodiphenylether, 2,2'-diaminodiphenylpropane, bis(3,5-diethyl-4-aminophenyl)methane, diaminodiphenylsulfone, diaminobenzophenon, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-aminophenoxy]phenyl]propane, 2,2-bis(4-aminophenyl)hexafluoropropane, 2,2-bis[4-(4-aminophenoxy)phenyl]hexafluoropropane, bis(4-aminocyclohexyl)methane, bis(4-amino-3-methylcyclohexyl)methane, 4,4'-diamino-3-dodecyldiphenyl ether, and 1-dodecarnoxy-2,4-idaminobenzene.

The polyimide copolymer may have a weight average molecular weight of 10,000 to 300,000 g/mol. More specifically, the polyimide copolymer may have a weight average molecular weight of 100,000 to 250,000 g/mol. In the case where the weight average molecular weight of the polyimide copolymer is in the aforementioned range, reliability and electro-optic properties may be improved, chemical resistance may be improved, and, even after the liquid crystal display is driven, a pretilt angle may be stably maintained.

The liquid crystal photo-alignment agent according to an exemplary embodiment may include a solvent for dissolving the polyimide copolymer. The solvent may be included to obtain the liquid crystal photo-alignment agent having superior spreadability and adhesion properties with a substrate.

Examples of the solvent may include N-methyl-2-pyrrolidone; N,N-dimethyl acetamide; N,N-dimethyl formamide;

dimethyl sulfoxide; γ-butyrolactone; tetrahydrofuran (THF); a phenol-based solvent such as meta-cresol, phenol, and halogenated phenol, and a cellosolve-based solvent such as 2-butyl cellosolve, but are not limited thereto.

Further, the solvent may further include alcohols, ketones, esters, ethers, hydrocarbons, or halogenated hydrocarbons that are a poor solvent at an appropriate ratio within the range where the soluble polyimide copolymer polymer is not precipitated. The poor solvents may reduce surface energy of the liquid crystal alignment agent to improve spreadability and flatness during application.

The poor solvent may be included in an amount of 1 to 90 wt % and, more specifically, 1 to 70 wt % based on the total amount of the solvent including the poor solvent.

As a specific example of the poor solvent, any one selected from methanol, ethanol, isopropanol, cyclohexanol, ethyleneglycol, propyleneglycol, 1,4-butanediol, triethyleneglycol, acetone, methylethylketone, cyclohexanone, methyl acetate, ethyl acetate, butyl acetate, diethyl oxalate, malonic acid ester, diethylether, ethyleneglycol monomethylether, ethyleneglycol dimethylether, ethyleneglycol monoethylether, ethyleneglycol phenylether, ethyleneglycol phenylmethylether, ethyleneglycol phenylethylether, diethyleneglycol dimethylether, diethyleneglycol ether, diethyleneglycol monomethylether, diethyleneglycol monoethylether, diethyleneglycol monomethylether acetate, diethyleneglycol monoethylether acetate, ethyleneglycol methylether acetate, ethyleneglycol ethylether acetate, 4-hydroxy-4-methyl-2-pentanone, 2-hydroxyethyl propionate, 2-hydroxy-2-methylethyl propionate, ethoxyethyl acetate, hydroxyethyl acetate, 2-hydroxy-3-methylmethyl butanoate, 3-methoxymethyl propionate, 3-methoxyethyl propionate, 3-ethoxyethyl propionate, 3-ethoxymethyl propionate, methylmethoxybutanol, ethylmethoxybutanol, methylethoxybutanol, ethylethoxybutanol, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene, and a combination thereof may be used.

In the liquid crystal photo-alignment agent, the content of the solvent is not particularly limited, but the solvent may be used so that the content of the solid in the liquid crystal photo-alignment agent is 0.1 to 30 wt % and specifically may be used so that the content of the solid in the liquid crystal photo-alignment agent is 1 to 25 wt %. In the case where the content of the solid is in the aforementioned range, the liquid crystal photo-alignment agent may be less affected by contamination of a substrate surface during printing and may thus maintain uniformity and an appropriate viscosity of the film. Therefore, deterioration of uniformity of the film due to a high viscosity during printing may be prevented, and appropriate transmittance may be exhibited.

The liquid crystal photo-alignment agent according to the exemplary embodiment may further include another additive.

Examples of the other additive may include an epoxy compound. The epoxy compound is used to improve reliability and an electro-optic property. One or more kinds of epoxy compounds including two to eight epoxy groups, and more specifically, two to four epoxy groups, may be used.

The epoxy compound may be included in the amount of 0.1 to 50 parts by weight and, more specifically, 1 to 30 parts by weight, based on 100 parts by weight of the polyimide copolymer. In the case where the epoxy compound is included in the aforementioned range, the liquid crystal photo-alignment agent may exhibit superior printing properties and improved flatness during application on the substrate, which may improve reliability and electro-optic properties.

Specific examples of the epoxy compound may include N,N,N',N'-tetraglycidyl-4,4'-diaminophenylmethane (TGDDM), N,N,N',N'-tetraglycidyl-4,4'-diaminophenylethane, N,N,N',N'-tetraglycidyl-4,4'-diaminophenylpropane, N,N,N',N'-tetraglycidyl-4,4'-diaminophenylbutane, N,N,N',N'-tetraglycidyl-4,4'-diaminobenzene, ethyleneglycoldiglycidylether, polyethyleneglycoldiglycidylether, propyleneglycoldiglycidylether, tripropyleneglycoldiglycidylether, polypropyleneglycoldiglycidylether, neopentylglycoldiglycidylether, 1,6-hexandioldiglycidylether, glycerinediglycidylether, 2,2-dibromoneopentylglycoldiglycidylether, 1,3,5,6-tetraglycidyl-2,4-hexandiol, N,N,N',N'-tetraglycidyl-1,4-phenylenediamine, N,N,N',N'-tetraglycidyl-m-xylenediamine, N,N,N',N'-tetraglycidyl-2,2'-dimethyl-4,4'-diaminobiphenyl, 2,2-bis[4-(N,N-diglycidyl-4-aminophenoxy)phenyl]propane, N,N,N',N'-tetraglycidyl-4,4'-diaminodiphenylmethane, 1,3-bis(N,N-diglycidylaminomethyl)cyclohexane, 1,3-bis(N,N-diglycidylaminomethyl)benzene, and the like, but are not limited thereto.

Further, in order to improve printing properties, an appropriate surfactant or coupling agent may be used as the additive.

The liquid crystal photo-alignment film according to another exemplary embodiment may be manufactured by using the liquid crystal photo-alignment agent.

The liquid crystal photo-alignment film may be manufactured by applying the liquid crystal photo-alignment agent on the substrate, performing a primary bake process, performing exposure, and performing a secondary bake process.

Examples of a method of applying the liquid crystal photo-alignment agent on the substrate may include a spin coat method, a flexo printing method, an inkjet method, or the like. Among the methods, the flexo printing method may be used because superior uniformity of a formed coat may be achieved and enlargement performance is enhanced.

The substrate used is without any particular limitation as long as the substrate is a substrate having high transparency. As such, a plastic substrate, a glass substrate, an acryl substrate, or a polycarbonate substrate may be used. Further, if an indium-tin oxide (ITO) electrode for driving a liquid crystal and the like is disposed on the substrate, a manufacturing process may be simplified.

The primary bake process may be performed at a temperature of 80° C. to 180° C. and, more specifically, 120° C. to 180° C., for 5 minutes to 300 minutes. The polyamic acid included in the liquid crystal photo-alignment agent may be converted into polyimide by the primary bake process.

Before the primary bake process, a pre-bake process may be performed at a temperature of 70° C. to 80° C. for 60 seconds to 80 seconds. A uniform coat having little or no deviation may be obtained by adjusting volatility of each component of the liquid crystal photo-alignment agent through the pre-bake process.

Uniaxial alignment treatment may be performed by radiating polarized light on the liquid crystal photo-alignment film. In this case, ultraviolet rays having a range of 240 nm to 380 nm, and, more specifically, 254 nm, may be used as radiated light. Polarized light may be radiated in the intensity of 0.20 J/cm$^2$ to 1.0 J/cm$^2$, and specifically 0.40 J/cm$^2$ to 0.50 J/cm$^2$.

During the exposure process, decomposition of an imide cycle of the polyimide copolymer occurs. A decomposition ratio of the imide cycle may be in the range of 10 to 30%. The decomposition ratio represents a difference Q1-Q2 between an imidization ratio Q1 before exposure and an imidization ratio Q2 after exposure. Decomposition ratio/unit is obtained by normalizing the decomposition ratio, and represents a value measured by performing conversion by (decomposition ratio/X)*100 when the imidization ratio Q1 before exposure is X %. The decomposition ratio/unit is in the range of 15% to 45%. Afterimage and anisotropic qualities may be improved in the aforementioned range. The decomposition ratio may be calculated by measuring a ratio of absorption intensities of a stretching bond of the compound before and after decomposition by a FTIR (Fourier transform infrared spectrometer) analysis method.

The exposed liquid crystal alignment film is subjected to secondary bake to manufacture the liquid crystal photo-alignment film. Alignment properties of the liquid crystal photo-alignment agent may be maximized through the aforementioned secondary bake process. Particularly, since the liquid crystal photo-alignment film improves afterimage effects, the liquid crystal photo-alignment film may be applied in, for example, a curved liquid crystal display. The secondary bake process may be performed at 140° C. to 230° C. for 20 minutes to 40 minutes.

According to still another exemplary embodiment, there is provided a liquid crystal display including the liquid crystal photo-alignment film.

FIG. 1 is a schematic cross-sectional view of the liquid crystal display including the liquid crystal photo-alignment film according to the exemplary embodiment.

Referring to FIG. 1, a liquid crystal display 1 includes a lower display panel 100, an upper display panel 200, and a liquid crystal layer 3.

In the lower display panel 100, a gate conductor including a plurality of gate lines (not illustrated) and a plurality of storage electrodes 133 is formed on an upper surface of a first substrate 110. On the gate conductor, a gate insulating layer 140, a plurality of semiconductors 154, plural pairs of ohmic contacts 163 and 165, a plurality of source electrodes 173, and a plurality of drain electrodes 175 are sequentially formed.

One gate electrode 124, one source electrode 173, and one drain electrode 175 form one thin film transistor (TFT), together with the semiconductor 154.

On an exposed portion of the semiconductor 154, the source electrode 173, the drain electrode 175, and the gate insulating layer 140, a passivation layer 180 is formed. On the passivation layer 180, a plurality of pixel electrodes 191 is formed.

Next, the upper display panel 200 will be described.

In the upper display panel 200, a light blocking member 220 is formed on a second substrate 210. On the second substrate 210 and the light blocking member 220, a plurality of color filters 230 is formed, and on the color filter 230, an overcoat 250 is formed. The overcoat 250 prevents the color filter 230 from being exposed to the liquid crystal layer 3 but may be omitted.

On an upper portion of the pixel electrode 191 of the lower display panel 100 and an upper portion of a common electrode 270 of the upper display panel 200, a first liquid crystal photo-alignment film 12 and a second liquid crystal photo-alignment film 22 are formed, respectively. The first liquid crystal photo-alignment film 12 and the second liquid crystal photo-alignment film 22 are manufactured by using the liquid crystal photo-alignment agent according to the exemplary embodiment described above.

FIG. 1 illustrates that the liquid crystal photo-alignment films 12 and 22 are formed on both the lower display panel 100 and the upper display panel 200, but the liquid crystal photo-alignment films 12 and 22 may be formed on only one of the upper display panel 200 or the lower display panel 100.

Hereinafter, the present invention will be described in more detail through Examples and Comparative Examples. The following Examples and Comparative Examples are set forth to illustrate, but are not to be construed to limit the present invention.

Manufacturing of Liquid Crystal Photo-Alignment Agent

Examples 1, 2, and 3 and Comparative Examples 1, 2, and 3

1 mole of p-phenylenediamine and then N-methyl-2-pyrrolidone (NMP) were put into a four-neck flask equipped with an agitator, a temperature adjustment device, a nitrogen gas injection device, and a cooler under dark room conditions while passing nitrogen to manufacture the mixture solution. 1,2,3,4-cyclobutanetetracarboxylic acid dianhydride (CBDA) and pyromellitic acid dianhydride (PMDA) in the solid state were put into the mixture solution at the mole ratio of 1.0 mole in the mole ratios described in the following Table 1, and agitated for about 1 hour. The temperature was maintained at 50° C. or less, and the reaction was performed for 24 hours to manufacture the polyamic acid solution. The manufactured polyamic acid solution was distilled to obtain the polyamic acid. The polyamic acid was added to the mixture solvent of N-methyl-2-pyrrolidone (NMP) and 2-butyl cellosolve (at a volume ratio approximately equal to 7:3) so that the total solid content was 7 wt %, followed by agitation at room temperature (25° C.) for 24 hours to manufacture the liquid crystal photo-alignment agents according to Examples 1, 2, and 3 and Comparative Examples 1, 2, and 3.

TABLE 1

|  | CBDA | PMDA |
| --- | --- | --- |
| Example 1 | 90 mole % | 10 mole % |
| Example 2 | 80 mole % | 20 mole % |
| Example 3 | 70 mole % | 30 mole % |
| Comparative Example 1 | 100 mole % | 0 mole % |
| Comparative Example 2 | 50 mole % | 50 mole % |
| Comparative Example 3 | 60 mole % | 40 mole % |

Manufacturing of Liquid Crystal Photo-Alignment Film

The liquid crystal photo-alignment agents according to Examples 1, 2, and 3 and Comparative Examples 1, 2, and 3 were each applied on an electrode, the applied liquid crystal photo-alignment agent was subjected to primary bake at 130° C. for 15 minutes. Ultraviolet rays of 254 nm were polarization-radiated in the intensity of 0.5 J/cm$^2$, and secondary bake was performed at 210° C. for 15 minutes to manufacture the liquid crystal photo-alignment film.

Manufacturing of Liquid Crystal Display

On an ITO glass substrate having the standardized size, in order to shape the ITO into a square shape having the size of 1.5 cm×1.5 cm and an electrode applying a voltage while removing the remainder of the ITO, patterning was performed by using a photolithography process.

On the patterned ITO substrate, the liquid crystal photo-alignment agents manufactured in Examples 1, 2, and 3 and Comparative Examples 1, 2, and 3 were each subjected to spin coating to form the thickness of 0.1 jam, primary bake was performed at 130° C. for 15 minutes, ultraviolet rays of 254 nm were polarization-radiated, and secondary bake was performed at 210° C. for 15 minutes to manufacture the liquid crystal photo-alignment film.

Two substrates including the liquid crystal photo-alignment film were attached so that the square ITO shapes corresponded to each other and a cell gap of 4.75 jam was maintained.

The liquid crystal display was manufactured by filling the liquid crystal in a cell manufactured by the aforementioned method.

Decomposition Ratio and Sensitivity

The decomposition ratio of the imide cycle of the liquid crystal photo-alignment film manufactured by the liquid crystal photo-alignment agent according to Examples 1, 2, and 3 and Comparative Examples 1, 2, and 3 was measured by the FTIR (Fourier transform infrared spectrometer) analysis method. The exposure amount during the exposure process of the liquid crystal photo-alignment film was measured together. The decomposition ratio and sensitivity of the liquid crystal photo-alignment film according to Examples 1, 2, and 3 and Comparative Example 2 are described in the following Table 2.

Evaluation of Afterimage

The afterimage qualities of the liquid crystal displays manufactured by the liquid crystal photo-alignment agents according to Examples 1, 2, and 3 and Comparative Examples 1, 2, and 3 were evaluated. The AC afterimage was evaluated by measuring the difference (A angle) between the initial angle of the liquid crystal molecules and the angle changed after driving, and the DC afterimage was evaluated as the luminance deterioration ratio based on initial luminance by measuring initial luminance and luminance after driving. The measurement results of Examples 1, 2, and 3 and Comparative Example 2 are described in the following Table 2.

TABLE 2

| | Example 1 | Example 2 | Example 3 | Comparative Example 2 |
|---|---|---|---|---|
| Decomposition ratio (%) | 11% | 11% | 10% | 7% |
| Sensitivity (J/cm$^2$) | 1.5 | 1.7 | 2.0 | 3.5 |
| Δ angle (degree) | 0.16 | 0.18 | 0.3 | 0.7 |
| Luminance deterioration ratio (%) | 30% | 45% | 55% | 60% |

Referring to Table 2, in the case of the liquid crystal alignment agents of Examples 1, 2, and 3, the decomposition ratio is maintained at 10% or 11% and sensitivity is excellent. Further, the liquid crystal displays including the liquid crystal photo-alignment agents of Examples 1, 2, and 3 have Δ angles that are smaller than that of the liquid crystal display including the liquid crystal photo-alignment agent according to Comparative Example 2. Thus, it can be seen that the AC afterimage is improved. Further, luminance deterioration ratios of the liquid crystal displays including the liquid crystal photo-alignment agents of Examples 1, 2, and 3 are in the an acceptable range, and thus the DC afterimage is improved when compared to the Comparative Example 2.

Exemplary embodiments provide a liquid crystal photo-alignment agent for use in a liquid crystal display having superior alignment properties, improvement of direct current (DC) afterimages, improvement of alternating current (AC) afterimage qualities, and superior film hardness.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal photo-alignment agent, comprising:
a polyimide copolymer comprising a first structure unit represented by Chemical Formula 1 and a second structure unit represented by Chemical Formula 2,
wherein the first structure unit comprises 80 to 90 mole % and the second structure unit comprises 10 to 20 mole %, based on 100 mole % sum total of the first structure unit and the second structure unit, (Chemical Formula 1)

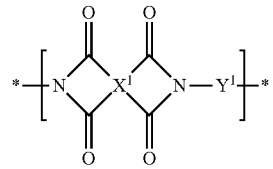

(Chemical Formula 2)

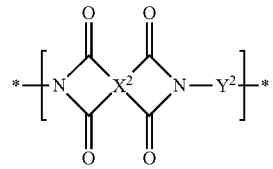

wherein in Chemical Formulas 1 and 2:
X$^1$ is a tetravalent organic group selected from Chemical Formula 1A,
X$^2$ is a tetravalent organic group of Chemical Formula 2A, and
Y$^1$ and Y$^2$ are divalent organic groups induced from aromatic diamine, (Chemical Formula 1A)

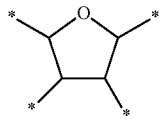
(1A-3)

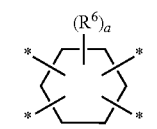
(1A-4)

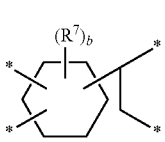
(1A-5)

wherein in Chemical Formula 1A:
$R^6$ and $R^7$ are each independently selected from hydrogen, a halogen, a substituted or unsubstituted C1 to C20 alkyl group, and a combination thereof,
a is an integer of 0 to 2,
b is an integer of 0 to 3, and
where b is 2 or more, each $R^7$ of a plurality of $R^7$s is the same or different from the others and each $R^7$ of a plurality of $R^7$s is connected to the others to form a fused ring fused with a cyclohexyl group, and

[Chemical Formula 2A]

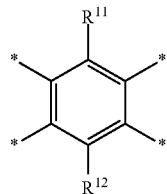

wherein in Chemical Formula 2A:
$R^{11}$ and $R^{12}$ are each independently selected from hydrogen, a halogen, a substituted or unsubstituted C1 to C20 alkyl group, and a combination thereof, and
wherein the polyimide copolymer has a weight average molecular weight of 10,000 to 300,000 g/mol.

2. The liquid crystal photo-alignment agent of claim 1, wherein the liquid crystal photo-alignment agent has 0.1 to 30 wt % of a solid.

3. A liquid crystal photo-alignment film comprising the liquid crystal photo-alignment agent of claim 1.

4. The liquid crystal photo-alignment film of claim 3, wherein:
a decomposition ratio representing a change from Q1 to Q2 is in a range of 10% to 30%,
Q1 is an imidization ratio before exposure of the liquid crystal photo-alignment film, and
Q2 is an imidization ratio after exposure of the liquid crystal photo-alignment film.

5. A method of manufacturing a liquid crystal photo-alignment film, comprising:
applying the liquid crystal photo-alignment agent of claim 1 on a substrate;
performing a primary bake process;
exposing the liquid crystal photo-alignment agent; and
performing a secondary bake process.

6. The method of claim 5, wherein the primary bake process is performed at a temperature of 80° C. to 180° C. for 5 minutes to 300 minutes.

7. The method of claim 5, wherein the exposure process is performed by using ultraviolet rays having a wavelength range of 240 nm to 380 nm.

8. The method of claim 5, wherein the secondary bake process is performed at 140° C. to 230° C. for 20 minutes to 40 minutes.

9. A liquid crystal display comprising the liquid crystal photo-alignment film of claim 3.

* * * * *